United States Patent

[11] 3,526,169

[72] Inventor Albert A. Levenson, Jr.
Worth, Illinois
[21] Appl. No. 731,406
[22] Filed May 23, 1968
Division of Ser. No. 333,846, Dec. 27, 1963, now Pat. No. 3,419,453
[45] Patented Sept. 1, 1970
[73] Assignee Continental Can Company, Inc.
New York, New York
a corporation of New York

[54] METHOD OF FORMING CONTAINERS FROM THERMOPLASTIC WEBS OR TUBING
4 Claims, 10 Drawing Figs.
[52] U.S. Cl..................................................... 93/35, 156/515
[51] Int. Cl...................................................... B31b 49/04

[50] Field of Search.................................... 93/8, 35; 156/515, 583

[56] References Cited
UNITED STATES PATENTS
3,053,723 9/1962 Plach et al.................. 156/515
3,147,168 9/1964 Bateman..................... 93/8X Primary Examiner—Bernard Stickney
Attorneys—Greist, Lockwood, Greenawalt and Dewey ABSTRACT: A method of fabricating bags in an automatic bag machine by feeding flattened thermoplastic tubing between conveyors which carry a means to grip the tubing at intervals and transversely seal the same so as to divide it into bag lengths and wherein provision is made for relieving the tension in the seal forming area of the material which normally results from pulling the material through the machine.

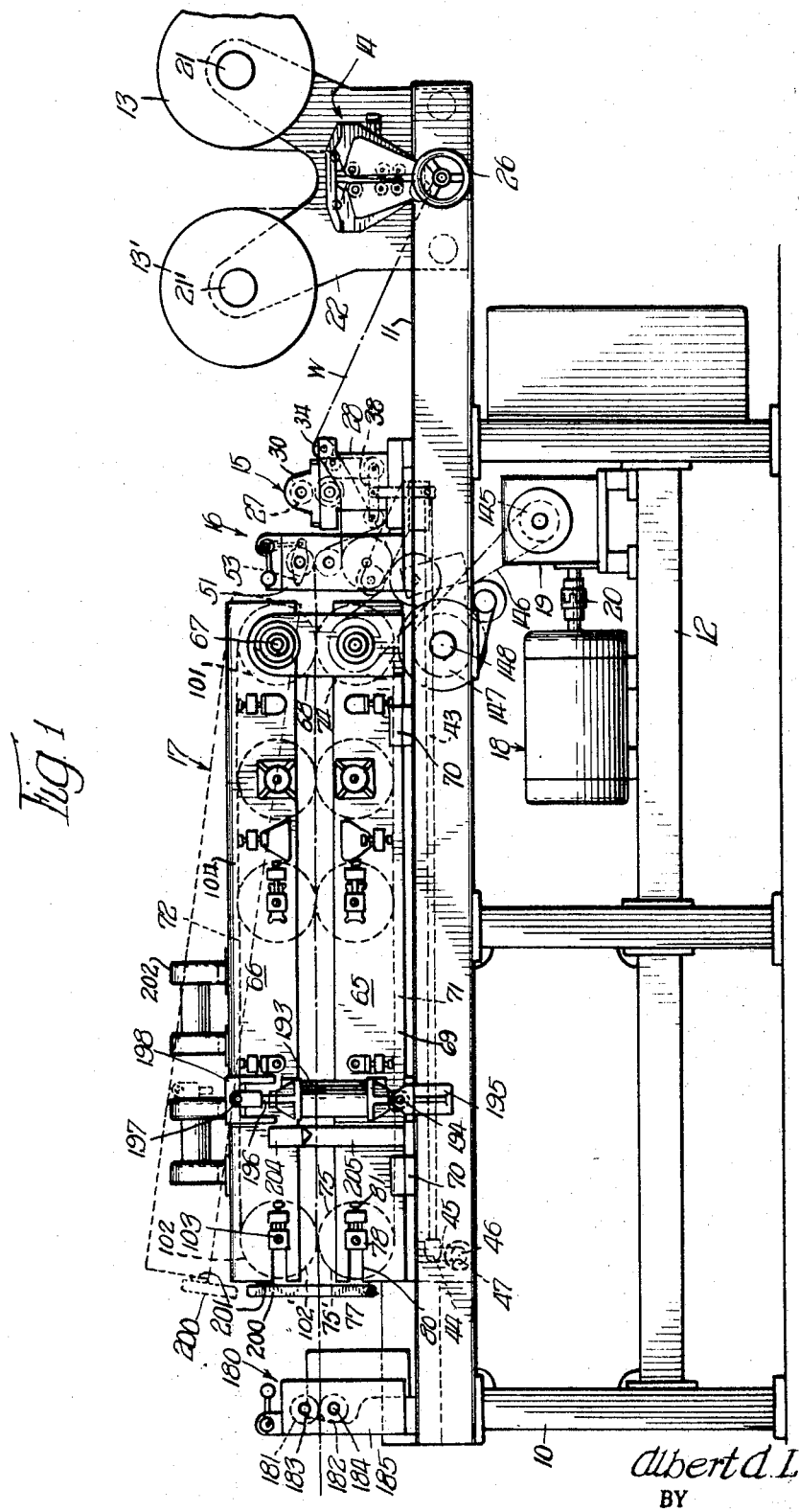

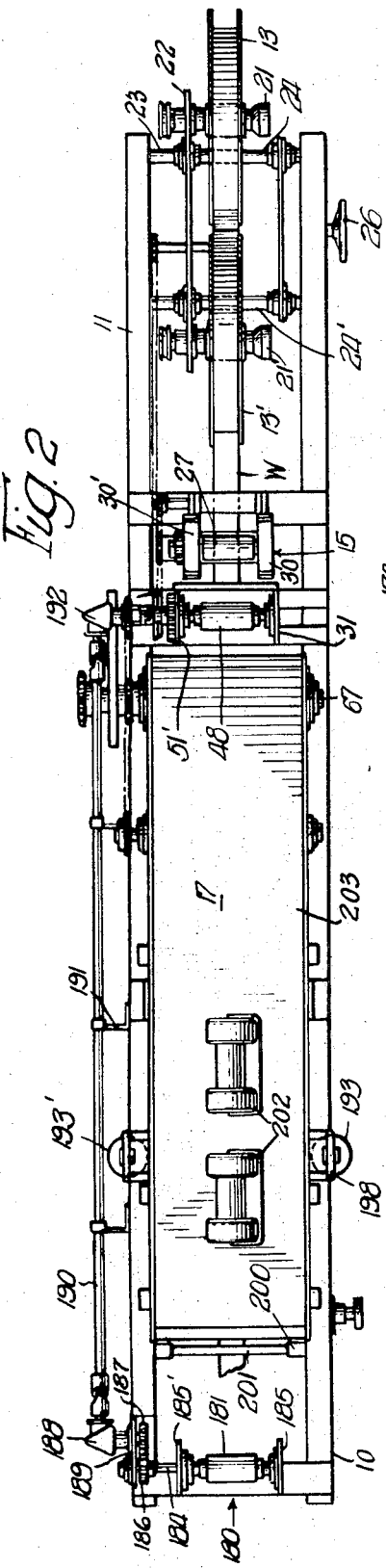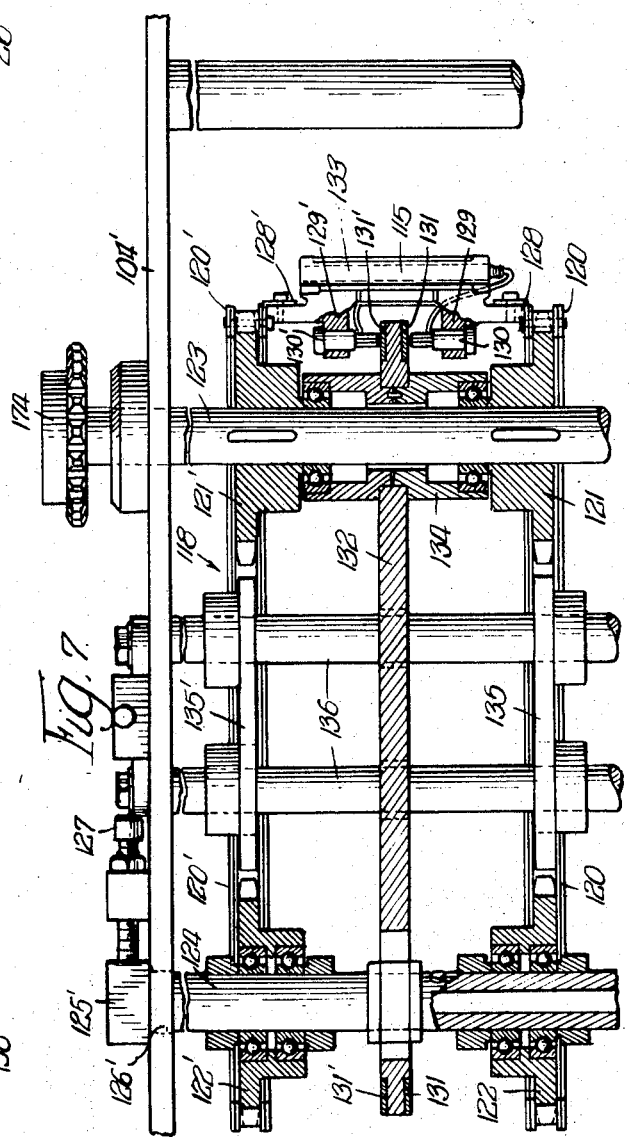

Patented Sept. 1, 1970
3,526,169
Sheet 3 of 7
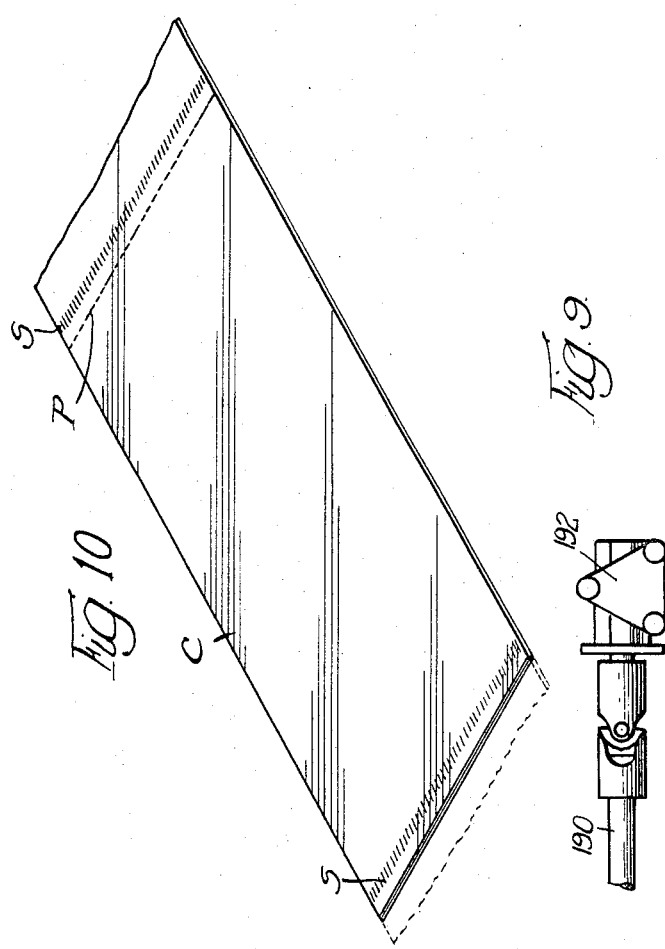
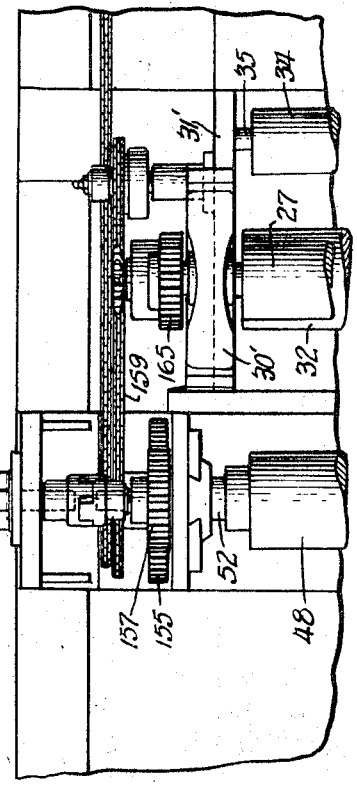
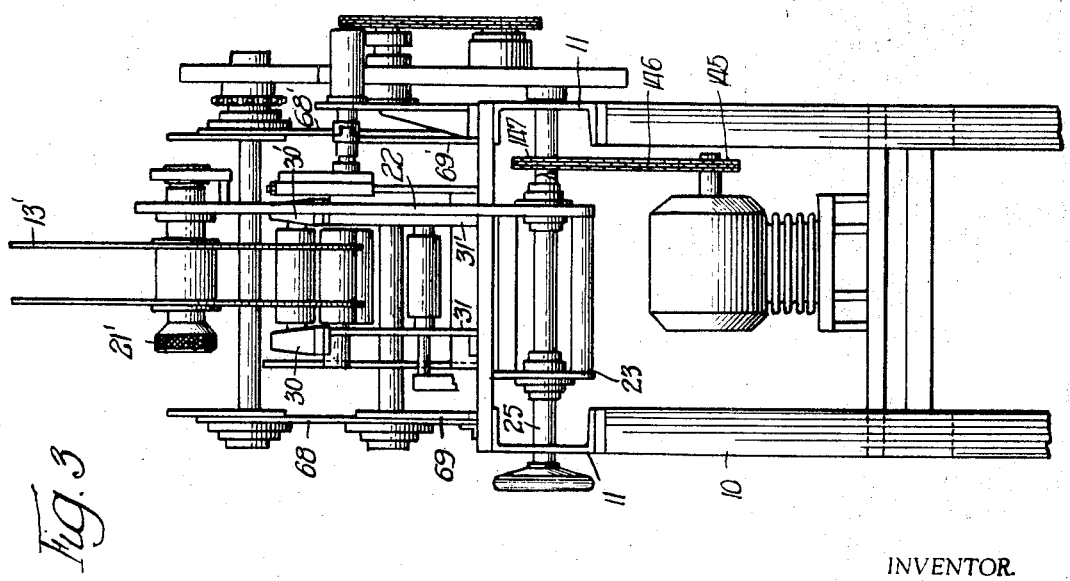
INVENTOR.
Albert A. Levenson, Jr.,
BY
Geist, Lockwood, Greenawalt & Dewey
ATTYS

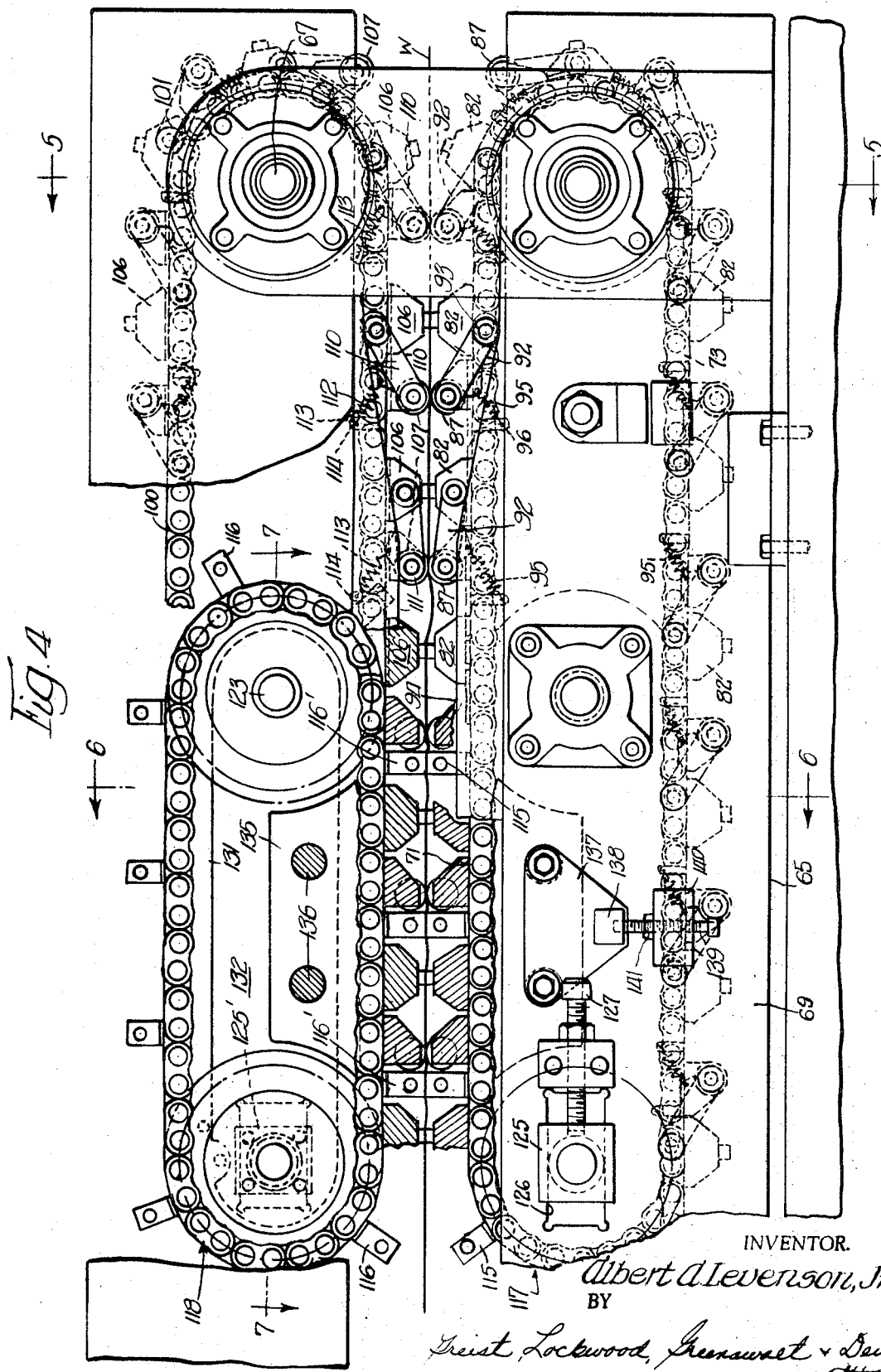

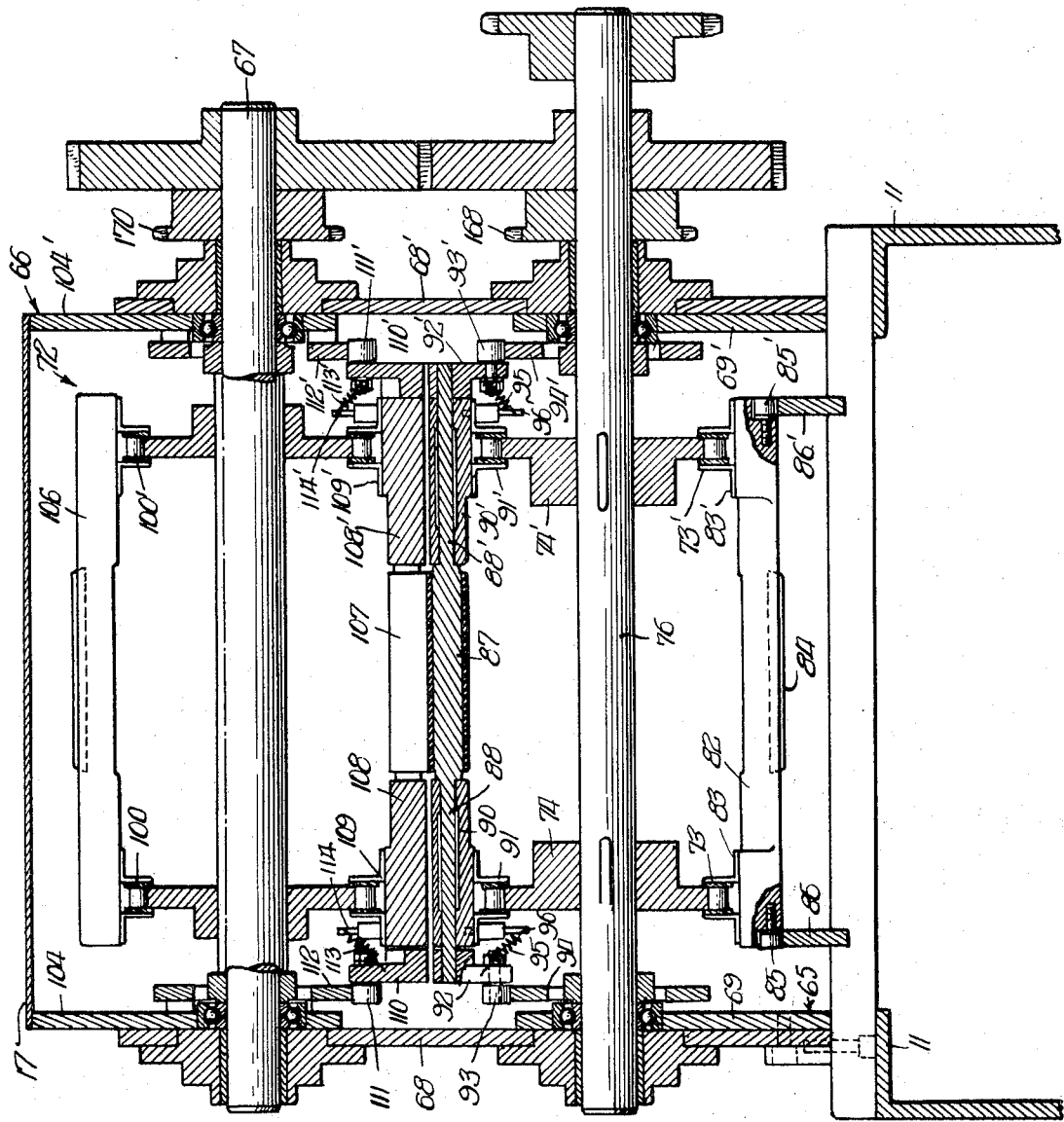

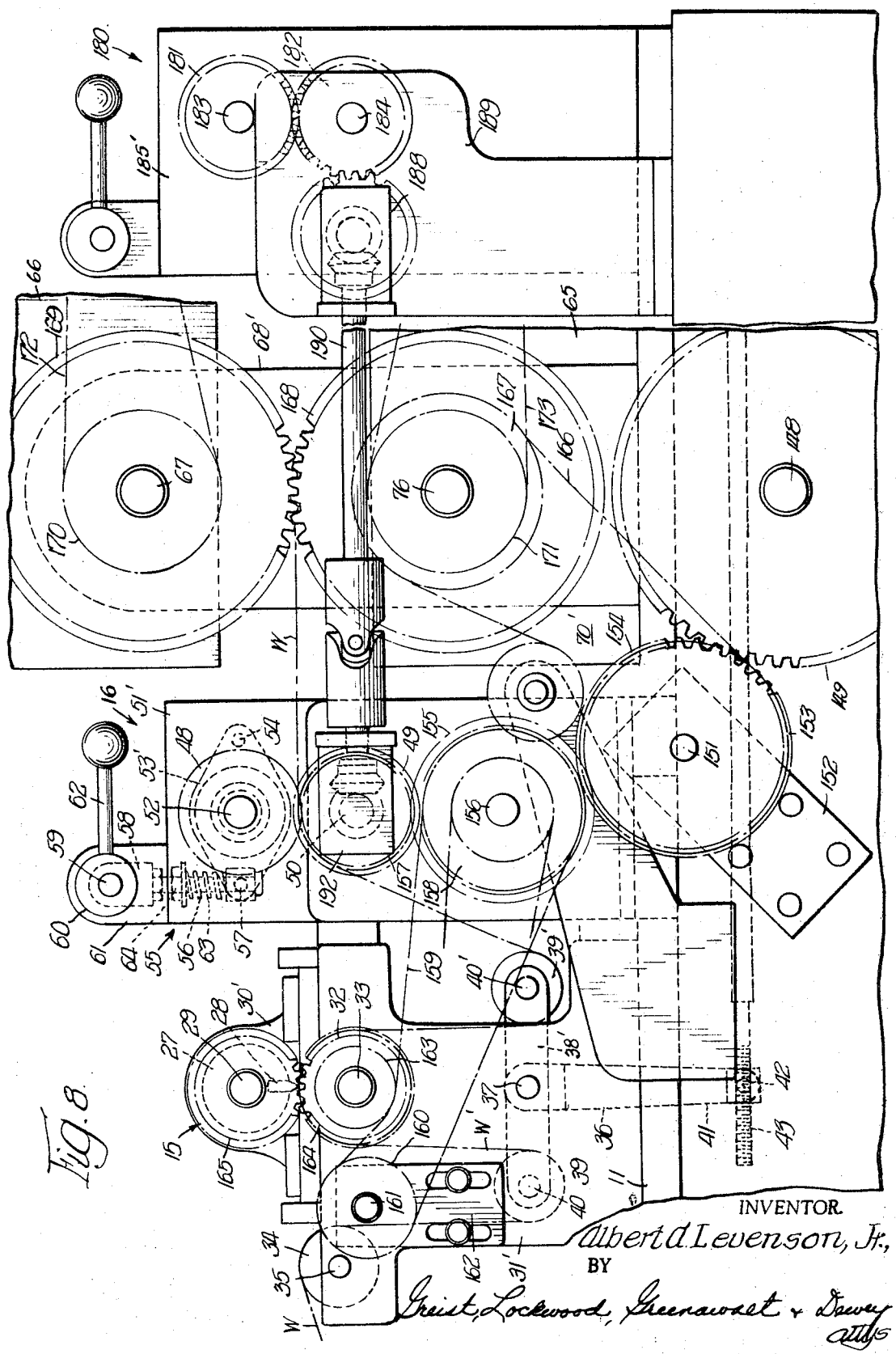

METHOD OF FORMING CONTAINERS FROM THERMOPLASTIC WEBS OR TUBING

This application is a division of Ser. No. 333,846, filed December 27, 1963, now Pat No. 3,419,453, issued Dec. 31, 1968.

This invention relates to container making and is more particularly concerned with improvements in a method for fabricating containers or bags from a continuous strip or web of flexible thermoplastic film materials.

Machinery has heretofore been provided for producing successive flattened containers from thermoplastic films or like materials by heat sealing a flattened thermoplastic tube along longitudinally spaced transverse lines while the flattened tube is advanced by draw rolls or the like, which usually place the material under a certain amount of tension. It has been found that many of the container units formed in this manner are defective because a satisfactory transverse seal is not obtained due to the tension in the material. It is an object of the present invention, therefore, to provide a method of feeding flattened plastic tubing through a heat sealing machine which will form successive containers by applying a transverse seal at longitudinally spaced intervals to the flattened tubing in a manner which results in a more satisfactory sealing of the tube so as to reduce to a minimum the number of defective containers due to improper sealing.

It is a more specific object of the invention to provide a container forming method wherein successive containers are formed from a flattened plastic tube by applying transverse seals at spaced intervals along the length of the tube with the tube being advanced so that longitudinal tension in the tube is relieved while the heat seal is being formed along the transverse seal line.

It is another object of the invention to provide a method of forming a succession of containers from a flattened tube of thermoplastic material by transversely sealing the tube at longitudinally spaced intervals wherein the tube is advanced between pairs of transverse sealing irons and the longitudinal tension in the tube is relaxed in the areas in which the transverse seals are made while the sealing irons are closed on the tube for effecting the seals.

It is another object of the invention to provide a container fabricating method which comprises feeding flattened bag making tube material between longitudinally extending, parallel endless conveyors arranged in vertical alignment with the upper and lower runs of the respective lower and upper conveyors of each pair being in opposed relation and having co-operating gripper means and sealing means arranged in longitudinally spaced relation on the respective conveyors which are operated to engage in gripping and sealing relation on opposite sides of flattened tubing, and having mechanism which is operative on the gripper means for shifting portions of the gripper means relative to adjoining portions thereof so as to relieve the tension in the tube in the area in which the sealing means is effective while the seal is formed.

It is a still further object of the invention to provide a method of fabricating bags from a continuous web of flexible thermoplastic film material in flattened tubular form, which comprises transversely perforating the material at longitudinally spaced intervals and feeding the perforated web between the opposed runs of conveyors having pairs of co-operating gripper bars fixed in spaced, transversely extending relation longitudinally of the conveyors for engaging on opposite sides of the web and pairs of co-operating, transversely extending gripper rollers rotatably mounted between the gripper bars for also engaging on opposite sides of the web, together with means for rotating the gripper rollers while the conveyors are advancing so as to advance leading portions of the bag forming sections of the web which are held between adjacent pairs of gripper bars relative to the remaining portions of the bag sections and thereby relieve the tension in the web between the gripper rollers and the gripper bars which are disposed immediately ahead of the rollers, and the conveyors also having pairs of co-operating, transversely extending sealing bars arranged to engage with the web in the areas of relieved tension for effecting successive transverse seals.

These and other objects and advantages of the invention will be apparent from a consideration of the bag fabricating method and the apparatus which is designed to carry out the method and which is shown by way of illustration in the accompanying drawings wherein:

FIG. 1 is a front side elevation of a machine which is adapted to fabricate containers in accordance with the method of the present invention, portions of the machine being broken away or omitted and other portions being shown schematically;

FIG. 2 is a plan view of the machine as shown in FIG. 1, with portions broken away or omitted;

FIG. 3 is an elevation at the tube feeding end of the machine, to an enlarged scale, and with portions omitted or broken away;

FIG. 4 is a partial front side elevation showing the web gripping and sealing portion of the machine, to an enlarged scale, and with portions broken away;

FIG. 5 is a transverse section taken on the line 5—5 of FIG. 4;

FIG. 7 is a horizontal section taken on the line 7—7 of FIG. 4;

FIG. 8 is a side elevation at the rear of the machine, with portions broken away;

FIG. 9 is a fragmentary plan view to an enlarged scale; and

FIG. 10 is a perspective view of a length of the completed bag material.

Figure 6:
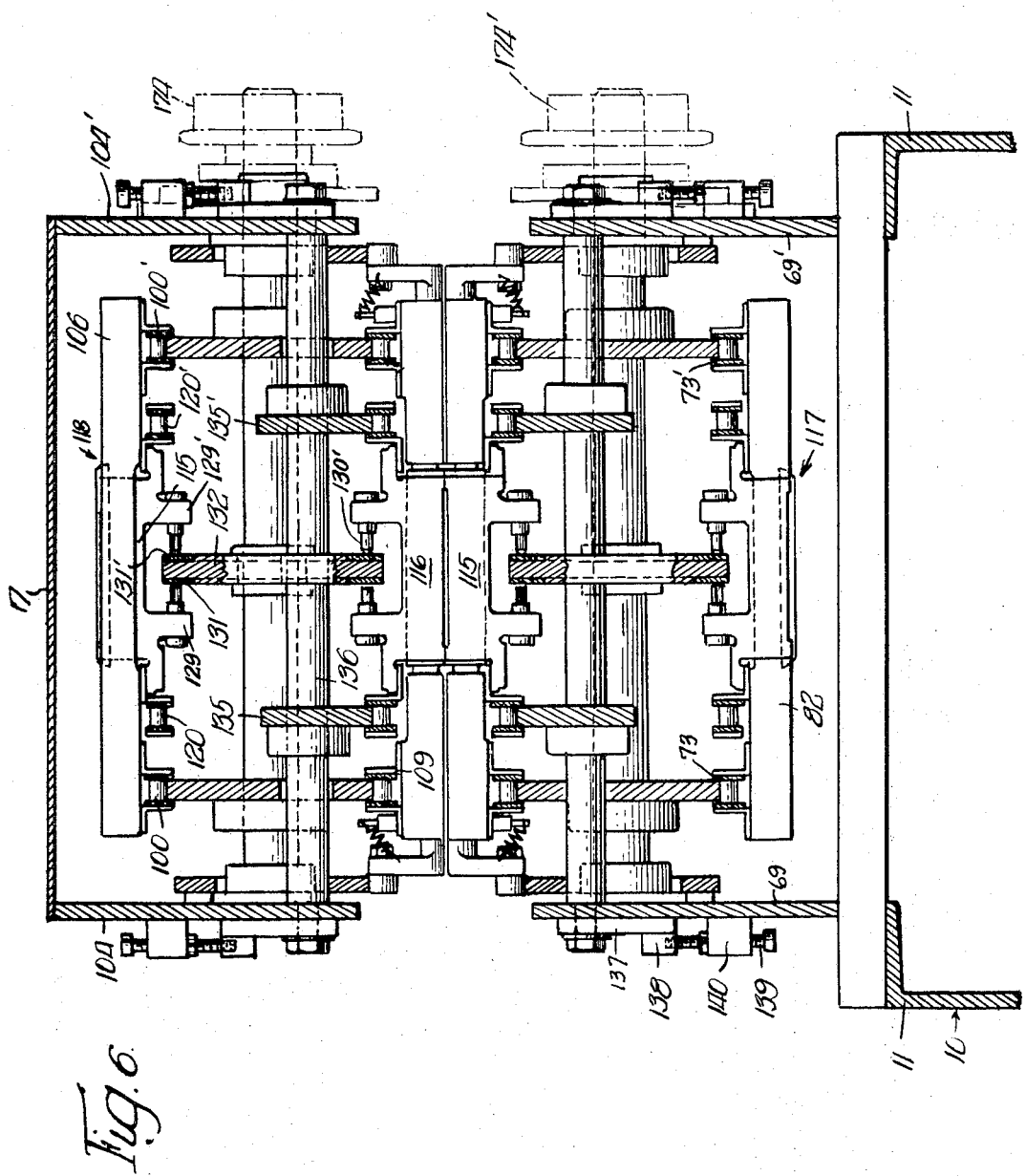
FIG. 6 is a transverse section taken on the line 6—6 of FIG. 4.

Referring to FIGS. 1 and 2 of the drawings, there is illustrated a supporting frame structure 10 which includes side, end and cross frame members arranged to provide a horizontally disposed, table-like top frame 11 and a bottom frame 12 also horizontally disposed beneath the top frame 11. The top frame 11 is provided with a supporting structure at one end for a pair of reels 13 and 13' providing a supply of flattened tubular bag forming material and a splice forming mechanism 14. The top frame 11 also supports a web perforating mechanism 15, a web feeding mechanism 16 and a horizontally disposed sealing mechanism 17 arranged in the order named. The bottom frame 12 supports a motor 18 and a speed reducing mechanism 19 which is driven from the motor 18 by connecting shaft 20 and which has a driving connection with the perforating, feeding and sealing mechanisms 15, 16 and 17 for operating the same in timed relation.

The machine is adapted to fabricate from a stock material which is in the form of an endless web W (FIGS. 1 and 2) of relatively flexible, heat sealable flattened tubular material, successive containers C which remain connected, as shown in FIG. 10, but which may be separated by tearing along transversely disposed perforation lines P adjacent each transverse seam S. The stock material is supplied on reels 13 and 13' in the form of a web W and the lines of perforations P and the transverse seams or seals S are applied by the instant machine. The stock material, or flattened tube, is preferably a transparent film of cellophane, Pliofilm or a like thermoplastic film material and it is preferably supplied as a pre-formed, extruded seamless tube. However, the tube may also be formed from a web of sheet material by longitudinally folding and sealing the same.

The supply reels 13 and 13' (FIGS. 1, 2 and 3) for the web material W are supported at the one end of the top frame 11 on cross shafts 21 and 21' extending from two upstanding leg portions on a vertically disposed bracket plate 22 which is connected at its lower margins to a small support frame 23 which is in turn supported within the frame 11 for adjustable sliding movement laterally of the frame 11 on a pair of parallel cross rods 24 and 24'. An adjusting shaft 25 has a threaded connection with the support frame 23 and a hand wheel 26 to facilitate adjustment for different widths of stock material W. The web W passes first through the flying splice mechanism 14, which is described in my application Ser. No. 333,846. It then advances to the perforating mechanism 15 which is supported on the top frame 11.

The perforating mechanism 15 (FIGS. 1, 2, 3, 8 and 9) comprises a perforator roll 27 having a perforating bar 28. The roll 27 is mounted on a cross shaft 29 which is journaled in a pair of end bearings 30 and 30' mounted on the top edges of upstanding, parallel, laterally spaced side frame plates 31 and 31' forming the main frame of the perforating unit 15. An anvil roller 32 is supported on a cross shaft 33 journaled at its ends in the side frame plates 31 and 31'. The web W enters the perforating mechanism 15 on a guide roller 34 which is supported on the cross shaft 35 journaled in the side plates 31 and 31' and a mechanism is provided for adjusting the location of the line of cross perforations P longitudinally of the web W. The adjusting mechanism comprises a T-shaped supporting frame 36 which is pivoted on a cross shaft 37 journaled in the side plates 31 and 31' and which includes top cross bars 38 and 38' on the ends of which a pair of rollers 39 and 39' are mounted on the cross shafts 40 and 40'. The depending stem forming portion 41 of the T-shaped supporting frame 36 has a pivot member 42 at the lower end which has a threaded aperture for receiving the threaded end of a rod 43 extending lengthwise along the front side of the machine. The rod 43 extends to a point near the discharge end of the machine where it is pivotally connected at 44 to the free end of a lever arm 45 on a cross shaft 46 which is journaled in the frame 11 and which has a knob 47 for manually rotating the shaft 46 so as to tilt the supporting frame 36 and raise or lower the respective rollers 39 and 39'. The web W passes downwardly over the entry roller 34 around the one adjusting roller 39 and upwardly between the anvil roller 32 and the perforating roller 27 and then down and around the other adjusting roller 39' and up to a pair of draw rollers 48 and 49, constituting the principal elements of the web feeding mechanism 16.

The lowermost draw roller 49 (FIG. 8) of the web feeding mechanism 16 is mounted in relatively fixed position on a cross shaft 50 which is journaled between laterally spaced, parallel side frame plates 51 and 51' upstanding from the frame 11. The uppermost draw roll 48 is mounted on a cross shaft 52 which is journaled in a pair of bearing plates 53 and 53' which are mounted in identical fashion on the inside of the side plates 51 and 51'. Each of the plates 53 and 53' is pivotally connected at one end by pin 54 to its respective side plate and at its opposite end to a pressure applying and release mechanism indicated at 55. The mechanism 55 includes a pair of vertically extending headed pins or bolts 56, each extending upwardly through a bore in a pivot block 57 pivotally connected to the bearing plate with its threaded upper end seated in a threaded bore in a member 58 which is rotatably carried on a cross shaft 59. The shaft 59 is fixed in members 60 at its ends and the latter are eccentrically mounted for rotation in upstanding bracket members 61 with one of the eccentrics 60 having an operating handle 62. Each hanger bolt 56 carries a compression spring 63 mounted thereon with one end seated on the pivot block 57 and the other end seated against a stop washer and nut 64. The plates 53 and 53' are normally urged in a counterclockwise direction about the pins 54 with the spring 63 under compression and pressure between the draw rolls 48 and 49 being relieved by manual rotation of the handle 62 so as to raise the roller 48 for threading the machine. The rollers 48 and 49 draw the web through the perforating unit 15 and deliver it to the sealing unit 17.

The sealing unit 17 (FIGS. 1 to 5) comprises a lower or bottom frame 65 which is disposed horizontally in fixed position lengthwise of the main support frame 11 and an upper or top frame 66 which is pivotally mounted for rotation on a cross shaft 67 which is journaled at its opposite ends in upstanding support plates 68 and 68' secured at their lower ends to the side frame plates 69 and 69' of the lower support frame 65 at the end of the frame 66 which is adjacent the web feeding mechanism 16. The two frames 65 and 66 carry endless web gripping conveyors 71 and 72 which extend longitudinally of the frames 65 and 66 with the inside runs thereof in oppositely disposed relation.

The lower gripping conveyor 71 comprises laterally spaced, endless chains 73 and 73' which are supported on longitudinally spaced pairs of end sprockets 74, 74' and 75, 75'. The sprockets in turn are carried on transverse shafts 76 and 77. The shaft 76 is journaled in fixed position in the vertically disposed plates 68 and 68' and in laterally spaced, vertically disposed, longitudinally extending side frame plates 69 and 69' (FIG. 5) of the lower frame 65 so that it is disposed in vertical alignment with the cross shaft 67 and the sprockets 74 and 74' are fixed thereon. The sprockets 75 and 75' are rotatably mounted on the cross shaft 77 at the opposite end of the conveyor 71. The shaft 77 is fixed in end blocks 78 which are slidingly supported in slots 80 in the side frame members 69 and 69' and each provided with an adjusting screw mechanism 81 for adjusting the tension in the chains 73 and 73'.

The chains 73 and 73' carry a plurality of longitudinally spaced gripper bars 82, each of which is secured to the chains by brackets 83 and 83' and each bar 82 has a peripheral insert 84 of resilient material for gripping the web. The bars 82 carry anti-friction rollers 85 and 85' (FIG. 5) at opposite ends which ride on longitudinally extending support rails 86 and 86' along the lower run of the conveyor. The conveyor 71 also carries longitudinally spaced gripper rollers 87 which have a middle portion covered with rubber or other resilient material and end shaft forming portions 88 and 88' of reduced cross section which are journaled in bearing forming brackets 90 and 90' secured by the angle brackets 91 and 91' to the chains 73 and 73'. The end shafts 88 and 88' extend beyond the outer ends of the bearings 90 and 90' and have secured thereon lever arms 92 and 92' with cam follower rollers 93 and 93' on the free ends thereof. The cam follower rollers 93 and 93' ride on laterally spaced, elongate cam plates 94 and 94' which are supported by suitable brackets in fixed parallel relation on the frame plates 69 and 69'. Tension springs 95 and 95' are connected at one end to intermediate portions of the lever arms 92 and 92' and at their other ends to bracket members 96 and 96' on the chains 73 and 73' so as to hold the cam follower rollers 93 and 93' on the cam plates 94 and 94'. The gripper rollers 87 and the gripper bars 82 are alternately spaced along the length of the chains 73 and 73'.

The upper chain conveyor 72 comprises a pair of laterally spaced chains 100 and 100' (FIGS. 4 and 5) which are supported on pairs of end sprockets 101, 101' and 102, 102' mounted on the cross shafts 67 and 103 at opposite ends of the vertically disposed, longitudinally extending, laterally spaced side plates 104 and 104' of the frame 66. The sprockets 101 and 101' are secured on the cross shaft 67 which is in fixed position at one end of the frame 66. The sprockets 102 and 102' are rotatably mounted on the shaft 103 at the other end of the frame 66 and the latter is fixed to mounting blocks 104 which are adjustably mounted in the same manner as the lower shaft 78 with like adjusting screw mechanisms. The upper conveyor 72 carries longitudinally spaced gripper bars 106 and longitudinally spaced web gripping rollers 107 which are mounted on the chains 100 and 100' in the same manner as the gripper bars 82 and web gripping rollers 87 on the lower conveyor 71 and which co-operate with the latter in gripping the web W between the same along the opposed runs of the two conveyors. The gripper rollers 107 are the same construction as gripper rollers 87 and are journaled in end bearing brackets 108 and 108' with the latter secured to the chains 100 and 100' by angle brackets 109 and 109'. The rollers 107 have lever arms 110 and 110' at their opposite ends with cam follower rollers 111 and 111' which engage with longitudinally extending cam plates 112 and 112'. The cam plates 112 and 112' are fixed to the frame plates 104 and 104' and extend throughout the length of the path of the chains 100 and 100' and the cam follower rollers 111 and 111' are held against the outer edge of the cam plates 112 and 112' by tension springs 113 and 113' connected at one end to intermediate portions of the arms 110 and 110' and at the other end to bracket members 114 and 114' secured on the chains 100 and 100'.

The co-operating web gripping bars 82 and 106, and the cooperating web gripping rollers 87 and 107 are spaced along the conveyors 71 and 72 according to the length of container being fabricated and so as to accommodate sealing bars 115 and 116 (FIGS. 4, 6 and 7) which are mounted in co-operating relation on lower and upper conveyors 117 and 118 also carried on the lower and upper gripping conveyor frames 65 and 66. The sealing iron conveyor structures 117 and 118 are of identical construction and only the upper one of these structures will be described in detail, it being understood that the lower conveyor 117 is of like construction. The upper sealing conveyor 118 (FIGS. 4, 6 and 7) comprises a pair of laterally spaced chains 120 and 120' which are carried on pairs of longitudinally spaced end sprockets 121, 121' and 122, 122'. The sprockets 121 and 121' at one end are fixed on a transverse shaft 123 journaled in the side plates 104 and 104' (FIG. 5) of the upper conveyor frame 66. At the other end of the chains 120 and 120' sprockets 122 and 122' are rotatably mounted on the cross shaft 124 which is fixed at its ends in slidably mounted block members 125 and 125' each of which is mounted in a slot 126, 126' in the side plates 104, 104' and provided with a tension adjusting device 127 of the same character as shown for the shaft 78. The bars 115 are connected at opposite ends to the chains 120 and 120' by angle brackets 128 and 128' and each bar 115 is provided with a pair of brush supports 129 and 129' and associated brush assemblies 130 and 130'. The brush assemblies 130 and 130' are arranged in oppositely disposed relation with the brushes positioned to ride on commutator rings 131 and 131' mounted on a vertically disposed supporting plate 132 so as to supply current to heating elements 133 incorporated in the sealing bars 115. The commutator plate 132 is supported at one end on the fixed cross shaft 124 and at the other end on a sleeve 134 mounted on the rotating drive shaft 123, by means of suitable ball bearings. The lower runs of the chains 120 and 120' are supported on the lower edges of adjustably mounted shoe forming, vertically disposed plates 135 and 135' which are supported in laterally spaced relation on a pair of cross rods 136 spaced longitudinally between the chain supporting shafts 123 and 124. The rods 136 are connected at their opposite ends to mechanisms for vertically adjusting their position. The adjusting mechanisms, one of which is shown in FIG. 4, in connection with the lower sealing conveyor 117, comprise a triangular plate 137 to which the ends of the cross rods 136 are bolted or otherwise secured at the top corners thereof as viewed in FIG. 4. The plate 137 carries a block 138 at its lower corner with a vertically disposed, threaded bore which receives the end of an adjusting screw 139. The adjusting screw 139 is mounted in a vertical bore in a block 140 secured to the side plate 69 of the lower frame 65. A stop nut 141 on the screw 139 rests on the top surface of the block 140 and permits vertical adjustment of the plate 137 which in turn provides vertical adjustment of the chain which rides on the top edge of the shoe which is carried on the cross bars attached to the plate 137. A corresponding adjusting mechanism is provided at both sides of each of the conveyors 117 and 118 for adjusting the path of the opposed runs of the two conveyors so as to adjust the pressure between the sealing irons 115 and 116. The sealing irons 115 and 116 are spaced on the lower and upper sealing conveyors and the latter are adjusted so that the bars 115 and 116 co-operate to engage the web on opposite sides thereof between a pair of the gripper bars 82, 106 and the next succeeding gripper rollers 87 and 107.

The various operating mechanisms are driven from the motor 17 (FIG. 1) through the speed change device 18. The speed change device 18 has an output sprocket 145 which is connected by drive chain 146 with the sprocket 147 on a transversely extending drive shaft 148 journaled in the side members of the support frame 11. A gear 149 (FIG. 8) on the shaft 148 drives a gear 150 on an adjoining cross shaft 151 which is journaled in brackets 152 on the frame 11 and carries gear 153 and sprocket 154 axially spaced thereon. The gear 153 drives a gear 155 on a cross shaft 156 journaled in the side plates 51 and 51' of the web feeding mechanism. The gear 155 drives the gear 157 on the one end of the shaft 50 which carries the one feed roll 49. The shaft 156 also has a sprocket 158 which is connected by a chain 159 with a sprocket 160 mounted on a stub shaft 161 which is supported in a vertically adjustable bracket plate 162 mounted on the side frame plate 31' of the perforating mechanism 15. Chain 159 engages a sprocket 163 on the cross shaft 33 which carries the anvil roll 32. The anvil roll shaft 33 and the perforating roll shaft 29 are connected in driving relation by the gears 164 and 165. The sprocket 154 on the cross shaft 151 is connected by chain 166 with a sprocket 167 on the drive shaft 76 of the lower conveyor 71 on the conveyor frame 65. The shaft 76 carries a gear 168 which engages with the gear 169 on the upper shaft 67 so as to drive the two conveyors 71 and 72 in synchronism. The shafts 76 and 67 also carry sprockets 170 and 171 which are connected in driving relation by the chains 172 and 173 with sprockets 174 and 174' on the ends of the drive shafts 123 and 123' for driving the sealing iron conveyors 117 and 118.

A take-off mechanism 180 (FIGS. 1, 2 and 8) is provided at the ends of the conveyor frames 65 and 66. The take-off mechanism 180 comprises a pair of draw rolls 181 and 182 mounted on cross shafts 183 and 184 which are supported in vertically disposed side plates 185 and 185'. The upper draw roll 181 may be supported in the same manner as the upper feed roll 48 at the infeed end of the conveyors so as to facilitate threading and adjustment of the pressure between the two draw rolls. The lower feed roll 182 has the shaft 184 extended so as to receive a gear 186 which engages with a gear 187 extending from a right angled gear connector 188 which is supported on a bracket 189 at the one side of the machine and connected to the end of a long drive rod 190 extending longitudinally on the back side of the machine and supported by bearing brackets 191. The shaft 190 is connected at its other end to a right angled gear connector 192 which is coupled to the end of the cross shaft 50 carrying the lower infeed roll 49 so that the infeed and outfeed are driven at the same speed.

The upper conveyor frame 66 is mounted for vertical swinging movement above the lower conveyor frame 65 about the axis of the transverse shaft 67 so as to permit ready separation of the web sealing and gripping members while the machine is in operation. A pair of hydraulic cylinders 193 and 193' are mounted in an identical manner on opposite sides of the conveyor frames 65 and 66. Each of the cylinders 193 and 193' is pivotally connected at 194 to a supporting bracket 195 mounted on the frame 11 and has its piston 196 pivotally connected at 197 to a bracket 198 attached to the side plate of the upper conveyor frame 66 so that when the cylinders 193 and 193' are actuated the frame 66 is pivoted about the axis of the shaft 67 to a raised position which separates the gripper bars and gripper rollers on the two conveyors 71 and 72 as well as the sealing bars 115 and 116 on the sealing conveyors 117 and 118. A U-shaped bracket 200 is mounted on a cross bar 201 at the discharge end of the conveyor frame 66 so that when the frame 66 is pivoted upwardly the web W will be lifted a sufficient distance to clear the sealing bars in the lower sealing conveyor 117. With this arrangement the upper conveyor frame 66 may be raised while the machine is in operation and the sealing bars 115 and 116 will be separated so as to avoid any burning of the web. Fans 202 may be mounted on the cover plate 203 on the top conveyor frame 66 for directing cooling air onto the web as it passes beneath the same. Additional fans (not shown) are mounted beneath the lower conveyor opposite the top fans. These fans direct cooling air upwardly onto the underside of the web as it passes above the same thereby cooling the seals from both sides. Interengaging stop bars 204 and 205 are provided on corresponding side plates of the two conveyor frames 65 and 66 to insure proper positioning of the upper frame 66 relative to the lower frame 65 when the upper frame is lowered into operative position.

I claim:

1. A method of fabricating bags from a continuous tube of flexible film material in flattened web form which method comprises perforating the web on transverse lines spaced longitudinally of the web so as to divide the web into successive bag forming sections, advancing the successive bag sections onto a traveling support, gripping the bag sections at points which are spaced a fixed distance apart in the direction of advance thereof, moving a portion of each bag section while it is being gripped at said points so that at least part of the material between the gripping points is relaxed and free of any longitudinal tension, and transversely sealing the material adjacent a line of perforations and in a part thereof which is held free of any longitudinal tension while the bag section is gripped at said points.

2. A method of fabricating bags as recited in claim 1 and moving said portion of each bag section in the direction of advance after the trailing portion thereof is gripped so as to relax a leading portion of each bag section.

3. A method of fabricating bags from a continuous tube of flexible film material which is in flattened web form, said method of comprising perforating the web on longitudinally spaced transverse lines to divide the web into successive bag forming sections, advancing the successive bag forming sections onto a traveling support, gripping each bag forming section so as to hold the same on the support at longitudinally spaced points, advancing a portion of each bag forming section relative to the support so that the length of the web disposed between said spaced gripping points is greater than the fixed distance between said gripping points thereby providing a relaxed web portion between said gripping points and transversely sealing the web in an area within said relaxed portion while said area is held on the support in a relaxed condition and free of any longitudinal tension.

4. A method of fabricating bags from a continuous tube of flexible film material which is in flattened web form, said method comprising advancing the flattened tubular web onto a traveling support, gripping the web at longitudinally spaced points so as to hold the same on the support, advancing a portion of the web between the gripping points relative to the support so that said portion is relaxed and held free of any longitudinal pull, and transversely sealing the web in an area which is within said relaxed portion while said web is held on the support.